Feb. 19, 1946.                L. B. CASE                2,395,101
                         SURFACING METAL ROLLS
                         Filed July 18, 1944         2 Sheets-Sheet 1
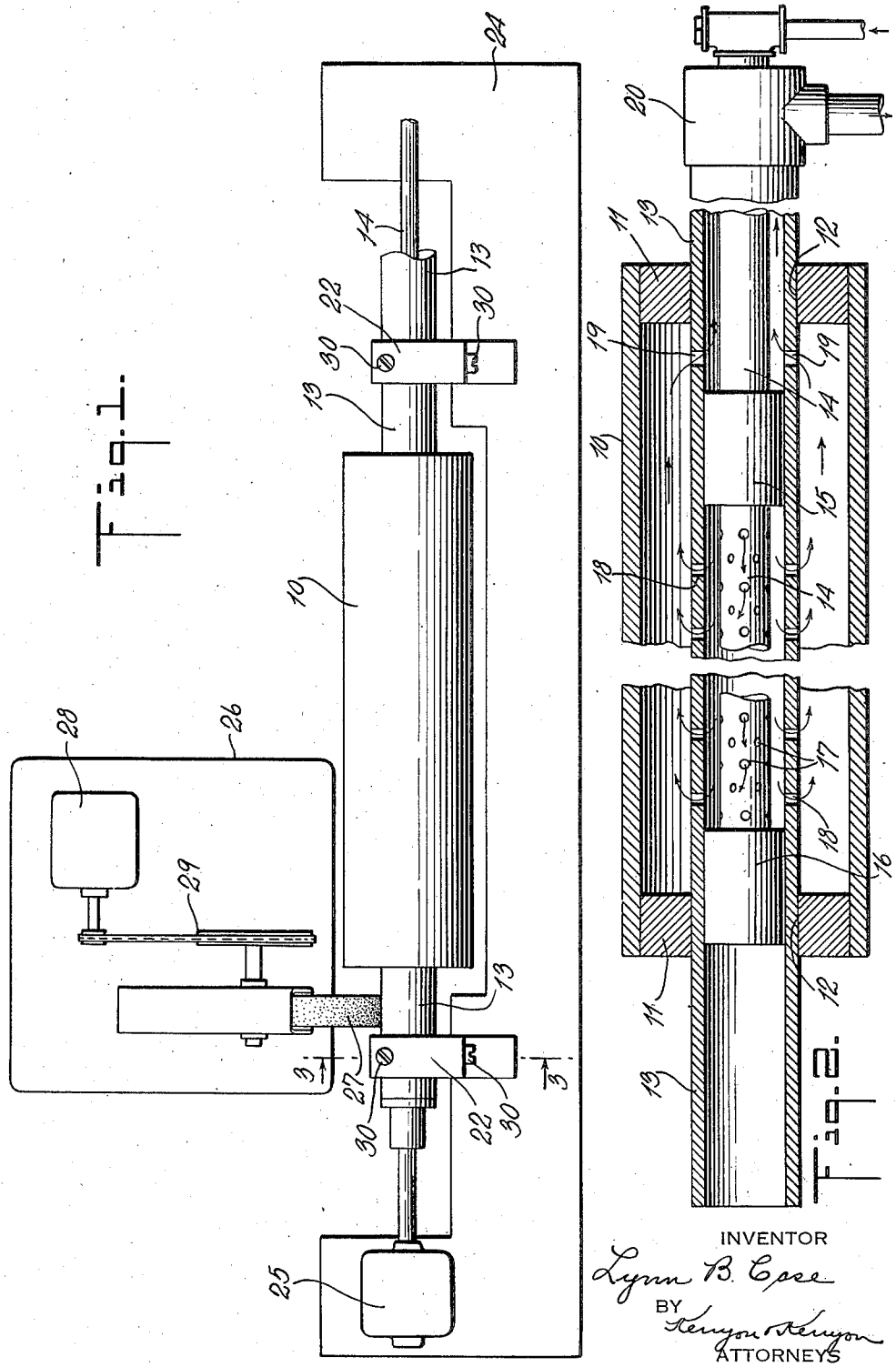
INVENTOR
Lynn B. Case
BY Kenyon & Kenyon
ATTORNEYS Feb. 19, 1946.   L. B. CASE   2,395,101
SURFACING METAL ROLLS
Filed July 18, 1944   2 Sheets-Sheet 2

INVENTOR
Lynn B. Case
BY
Kenyon Kenyon
ATTORNEYS

Patented Feb. 19, 1946

2,395,101

UNITED STATES PATENT OFFICE 2,395,101

SURFACING METAL ROLLS

Lynn B. Case, Bound Brook, N. J., assignor to John Waldron Corporation, New Brunswick, N. J., a corporation of New Jersey Application July 18, 1944, Serial No. 545,481

4 Claims. (Cl. 51—289)

This invention relates to surfacing metal rolls.

In some types of machines such, for example, as an ink-distributing device for printing machines using so-called hot melt ink, heated rolls are provided for transferring the ink from the ink fountain to the printing cylinder. Such a device is illustrated in the patent to Case, No. 2,255,410. The roll disclosed in said patent is of hollow construction and is provided with hollow journals by which it is rotatably supported and through one of which hot liquid is circulated through the interior of the roll for the purpose of maintaining it at a predetermined temperature. Proper operation of the distributing device requires that the surface of the roll be of a high degree of cylindrical accuracy at its operating temperature. Otherwise, uniformity of the ink distribution cannot be obtained and the printing will be of inferior quality.

An object of this invention is a method of surfacing a roll of the type mentioned to provide a contact surface having a high degree of cylindrical accuracy at elevated temperature.

In the production of a roll such as above referred to, the surface of the roll and the surfaces of the journals are initially produced by machining and the final truing of the surfaces is effected by a grinding operation. For the grinding operation, the roll is rotatably supported preferably by low heat conductivity members contacting each journal surface and extending radially therefrom and suitable means are provided for effecting rotation of the roll. In one journal, means are provided for circulating hot liquid through the roll in such manner as to heat the roll surface uniformly and hot liquid is supplied to said means from a suitable source under proper conditions to maintain the roll at a predetermined temperature. Escape of heat from the roll through its supporting members is substantially prevented by the low heat conductivity of said members. A rotating grinding wheel is provided for selective engagement with the roll surface and the journal surfaces and the roll and the grinding wheel are supported for relative parallel reciprocation.

In the preferred operation of truing the roll surface, one journal surface is first ground to a predetermined degree of cylindrical accuracy, after which the second journal surface is ground to the same degree of cylindrical accuracy. Next, the first journal surface is ground to a higher degree of cylindrical accuracy, after which the second journal surface is also ground to the same higher degree of cylindrical accuracy. Usually, two grinding operations are sufficient but if not, the journal surfaces may be further alternately subjected to grinding operations until the required degree of cylindrical accuracy is obtained. After both journal surfaces have been brought to the desired degree of cylindrical accuracy, the roll surface is subjected to a grinding operation until it also attains a predetermined degree of cylindrical accuracy. The entire series of grinding operations is carried on with the roll maintained at the temperature at which it will be maintained during its operation in the ink-distributing device or other mechanism in which it is to be incorporated. A roll which has been surfaced according to the procedure just described will always present a surface of the desired cylindrical accuracy and size at the predetermined temperature of operation inasmuch as the surfacing has been accomplished under the same temperature conditions as will prevail when the roll is in operation.

Other objects, novel features and advantages of this invention will become apparent from the following specification and accompanying drawings, wherein:

Fig. 1 illustrates in plan view the mechanical equipment for practicing the invention;

Fig. 2 is a fragmentary longitudinal section of a roll surface according to the invention.

Figure 3:
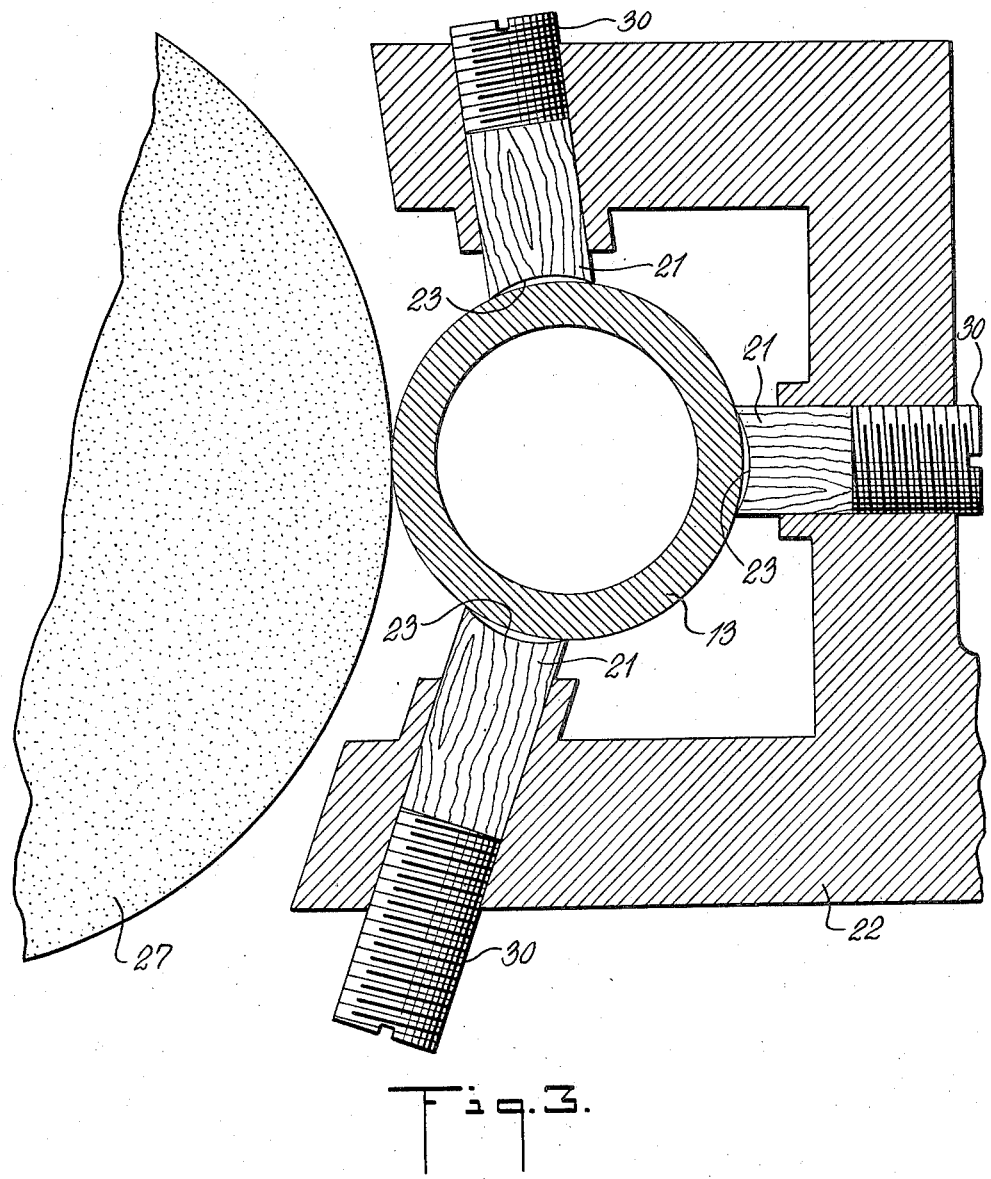
Fig. 3 is an enlarged section on the line 3—3 of Fig. 1.

The roll 10 illustrated in Fig. 2 comprises a cylindrical shell sealed at each end by a plug 11 having a central aperture 12. A hollow shaft 13 is sealed into the bores 12 and projects beyond the plugs 11, the projecting ends constituting the journals for the roll. A pipe 14 is arranged in the shaft 13 and is provided near one plug 11 with an abutment 15 and near the other plug 11 with an abutment 16 sealing the hollow shaft 13 and between the abutments 15 and 16 the pipe 14 is provided with a plurality of apertures 17. Also between the abutments 15 and 16, the shaft 13 is provided with a plurality of apertures 18 and additional apertures 19 between the abutment 16 and the adjacent plug 11. At the end of the shaft is provided a coupling 20 in which the shaft 13 and the pipe 14 are rotatable and has an inlet and an outlet communicating respectively with the end of the pipe 14 and the space between the pipe 14 and the inner surface of the shaft 13. By this arrangement, liquid may be introduced into the roll through the pipe 14 and circulated by way of the apertures 17, 18 and 19 through the roll 10 and discharged therefrom through the coupling 20 during rotation of the roll.

For the operation of grinding the roll and journal surfaces, the roll is rotatably supported by means of preferably three members 21 of low heat conductivity engaging each journal bearing surface, the members 21 being arranged radially with respect to the journal bearing surfaces and being angularly spaced about the periphery of the journal surface. Preferably, each member 21 is composed of a block of hard wood having its grain arranged radially of the journal surface 10 and mounted in a bracket 22. The inner end 23 of each member 21 is of arcuate shape and preferably of substantially the same radius as that of the journal surface to be attained when the grinding operation is completed. In Fig. 3, the difference in curvature is greatly exaggerated for illustrative purposes. The surface 23 is, therefore, of smaller radius than the journal surface at the start of the grinding operation. The brackets 22 are mounted on a bed 24 on which is also supported a motor 25, the armature of which is suitably connected to the end of the roll opposite the coupling 20 to effect rotation of the roll.

On a suitable frame 26 is rotatably supported a grinding wheel 27 together with a motor 28 and power-transmission means 29 for effecting rotation of the grinding wheel 27 by the motor 28. The frame 26 is supported by means (not shown) for movement toward and away from the bed 24 and either the bed 24 or the frame 26 is mounted for reciprocation parallel to the axis of the roll 10. Suitable means (not shown) are provided for effecting reciprocation of either the bed 24 or the frame 26.

A suitable source of heating medium (not shown) is maintained at a predetermined temperature and through the medium of pipes (not shown) such liquid is introduced through pipe 14 into the interior of the roll 10 and is withdrawn therefrom through the coupling 20. The rate of flow of the liquid through the roll 10 is properly regulated to maintain the roll surface and the journal surfaces at a predetermined temperature. Loss of heat from the journals through the supporting members 21 is substantially prevented by the low heat conductivity of said members. A hood (not shown) may be provided around the roll and its supports for minimizing the loss of heat from the surface of the roll due to the unequal cooling effect of stray air currents. Preferably, the heating medium is a liquid having a vaporization temperature higher than the temperature to which the roll is to be heated. However, by maintaining the heating medium under superatmospheric pressure a liquid may be used having a vaporization temperature somewhat less than the temperature desired at the periphery of the roll.

After the roll 10 has been heated to a desired temperature, rotation thereof is effected and the grinding wheel 26 is brought into engagement with one journal surface and relative parallel reciprocation of the grinding wheel and roll is effected either by reciprocation of the frame 26 or reciprocation of the bed 24. The grinding of the journal surface is continued until a predetermined degree of cylindrical accuracy is attained, this degree of accuracy being ascertained by suitable gauges. By the same procedure, the second journal is ground to the same predetermined degree of cylindrical accuracy. The first journal is then additionally ground to a higher degree of cylindrical accuracy, after which the second journal is likewise ground to the same high degree of cylindrical accuracy. Usually, two grindings are sufficient to obtain the required degree of cylindrical accuracy but if the two grindings are not sufficient the journals are alternately ground until they attain the desired degree of cylindrical accuracy. After the grinding of the journal surfaces has been effected to the desired degree of cylindrical accuracy, the surface of the roll 10 is engaged by the grinding wheel 27 and is brought to the desired degree of cylindrical accuracy. Throughout the entire grinding operation, the roll and its journal are maintained at a predetermined temperature, this temperature being the same as the temperature at which the roll will be operated after incorporation in the mechanism for which it is designed.

As the journals are ground to the predetermined degree of cylindrical accuracy, their diameters are decreased until the radius of the journal equals the radius of the accurate surfaces 23. While three members 21 have been illustrated, it is contemplated that the upper member may be omitted and the roll may be supported by merely the lower and intermediate members. Screws 30 are provided for effecting radial adjustment of the members 21.

While the invention has been disclosed in its application to a roll of the type illustrated in Fig. 2, it is equally applicable to other types of rollers. The invention may be utilized to grind the surface of any form of roll having provision for circulating heating medium through it during the grinding operation.

It is therefore to be understood that various modifications may be made from the full disclosure without in any way departing from the spirit of the invention as defined in the appended claims.

I claim:

1. The method of cylindrically truing the surface of a hollow roll having end journals at least one of which has a passageway leading from the interior of the roll to the end of the journal to provide for circulating hot liquid through said roll when in operation, which method comprises rotatably supporting the roll on its journals, circulating hot liquid through said roll and maintaining the roll at a predetermined temperature, and guiding each roll journal and the roll body to the desired accuracy.

2. The method according to claim 1 characterized by completing the grinding of both journal surfaces prior to starting the grinding of the roll surface.

3. The method according to claim 1 characterized by alternately grinding the journal surfaces until a predetermined degree of accuracy is obtained and subsequently grinding the roll surface.

4. Apparatus for cylindrically truing the surface of a hollow roll having end journals at least one of which has a passageway leading from the interior of the roll to the end of the journal to provide for circulating hot liquid through said roll when in operation, said apparatus comprising a plurality of low heat conductivity members arranged to contact the surface of each journal in radial relation thereto, means supporting said members, a grinding wheel, means supporting said grinding wheel for selective engagement with the surfaces of said roll and its journals, one of said means being capable of reciprocation parallel to the axis of said roll, means for effecting rotation of said roll, means for rotating said grinding wheel, and means for circulating hot liquid through said roll.

LYNN B. CASE.